United States Patent [19]

Parish

[11] Patent Number: 4,601,347

[45] Date of Patent: Jul. 22, 1986

[54] AUTOMATIC REVERSIBLE WHEEL TRACK FILLER

[75] Inventor: Carl D. Parish, Earth, Tex.

[73] Assignee: K.M.P. Manufacturing Co., Inc., Earth, Tex.

[21] Appl. No.: 556,040

[22] Filed: Nov. 29, 1983

[51] Int. Cl.[4] .......................... A01B 63/08; B66F 7/22
[52] U.S. Cl. .................................... 172/134; 172/200; 172/676; 172/236; 172/712; 254/94
[58] Field of Search .............. 172/236, 502, 199, 200, 172/574, 156, 179, 255, 237, 243, 134, 240, 576, 676, 712, 618, 681, 90; 254/94

[56] References Cited

U.S. PATENT DOCUMENTS

| | | | |
|---|---|---|---|
| 1,108,263 | 8/1914 | Smith | 172/364 |
| 2,502,835 | 4/1950 | Dunsdon | 172/90 |
| 2,673,434 | 3/1954 | Babinchak | 172/178 |
| 3,230,969 | 1/1966 | Purtell | 254/94 X |
| 3,652,056 | 3/1972 | King | 254/94 |
| 3,951,383 | 4/1976 | Tenney | 254/94 |
| 4,059,911 | 11/1977 | Bean et al. | 172/574 X |
| 4,262,752 | 4/1981 | Parish | 172/574 |

FOREIGN PATENT DOCUMENTS

| | | | |
|---|---|---|---|
| 1014471 | 8/1952 | France | 172/236 |
| 319142 | 3/1957 | Switzerland | 172/236 |

Primary Examiner—Richard J. Johnson
Assistant Examiner—Terrence L. B. Brown
Attorney, Agent, or Firm—Harvey B. Jacobson

[57] ABSTRACT

A direction of movement sensing apparatus is shiftably supported from the wheel track filling structure of a wheeled support tower for an irrigation pipe and is operative to shift between a first inoperative position assumed thereby when the tower is moving in a forward direction toward a second operative position relative to the wheel track filling structure when the tower is moved rearwardly over the ground. Connecting structure is provided and operatively connected between the direction sensing apparatus, the wheel track filling structure and the tower for raising the wheel track filling structure responsive to movement of the sensing apparatus to the second operative position thereof and thus enabling the tower to move rearwardly without damage to the wheel track filling structure.

7 Claims, 4 Drawing Figures

AUTOMATIC REVERSIBLE WHEEL TRACK FILLER

BACKGROUND OF THE INVENTION

Various forms of wheeled towers for supporting elevated irrigation pipes and moving the irrigation pipes over the ground are provided with trailed wheel track filling structure for filling in the depressed wheel tracks of the wheels of the tower as the tower moves forwardly over the ground. However, most previously known forms of wheel track filling structure can be damaged by rearward movement of the tower and thus a plurality of towers supporting a length of irrigation pipe may not be moved rearwardly until all of the wheel track filling structures thereof have been elevated above the ground. Accordingly, a need exists for structure whereby the wheel track filling structure may be automatically raised above the ground responsive to rearward movement of an associated wheeled irrigation pipe supporting tower.

Examples of various different forms of reversible disk structures as well as other devices including some of the general structural and operational features of the instant invention are disclosed in U.S. Pat. Nos. 2,533,150, 3,640,347, 4,139,018, 4,192,388, 4,209,086 and 4,262,752. However, these previously known devices are not operative in the manner of the instant invention wherein the wheel track filling structure of an irrigation pipe support tower may be automatically raised to an inoperative position responsive to rearward movement of the tower.

BRIEF DESCRIPTION OF THE INVENTION

The wheel track filler of the instant invention is mounted from the rear of an associated wheeled irrigation pipe support tower and is operative to fill in the depressed tracks of the wheels of the tower as the tower moves forwardly over the ground. In addition, the wheel track filler has operatively associated therewith direction of movement sensing structure shiftably supported from the wheel track filler between inoperative and operative positions assumed when the tower is moving forwardly and rearwardly, respectively. When the movement sensing structure is shifted toward the operative position connecting structure connected between the direction of movement sensing structure, the wheel track filling structure and the tower is operative to raise the wheel track filling structure to an elevated inoperative position spaced above the ground.

The main object of this invention is to provide a wheel track filler including structure whereby rearward movement of an associated irrigation pipe support tower relative to the ground will be effective to elevate the wheel track filling structure to an inoperative position spaced above the ground.

Another object of this invention is to provide a wheel track filling structure in accordance with the preceding objects and which may be readily used in conjunction with various different types of wheeled irrigation pipe supporting towers.

Yet another object of this invention is to provide a wheel track filling structure including adjustment features thereof to enable the wheel track filling structure to be used in conjunction with different types of soil.

A final object of this invention to be specifically enumerated herein is to provide a wheel track filler structure in accordance with the preceding objects and which will conform to conventional forms of manufacture, be of simple construction and automatic in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
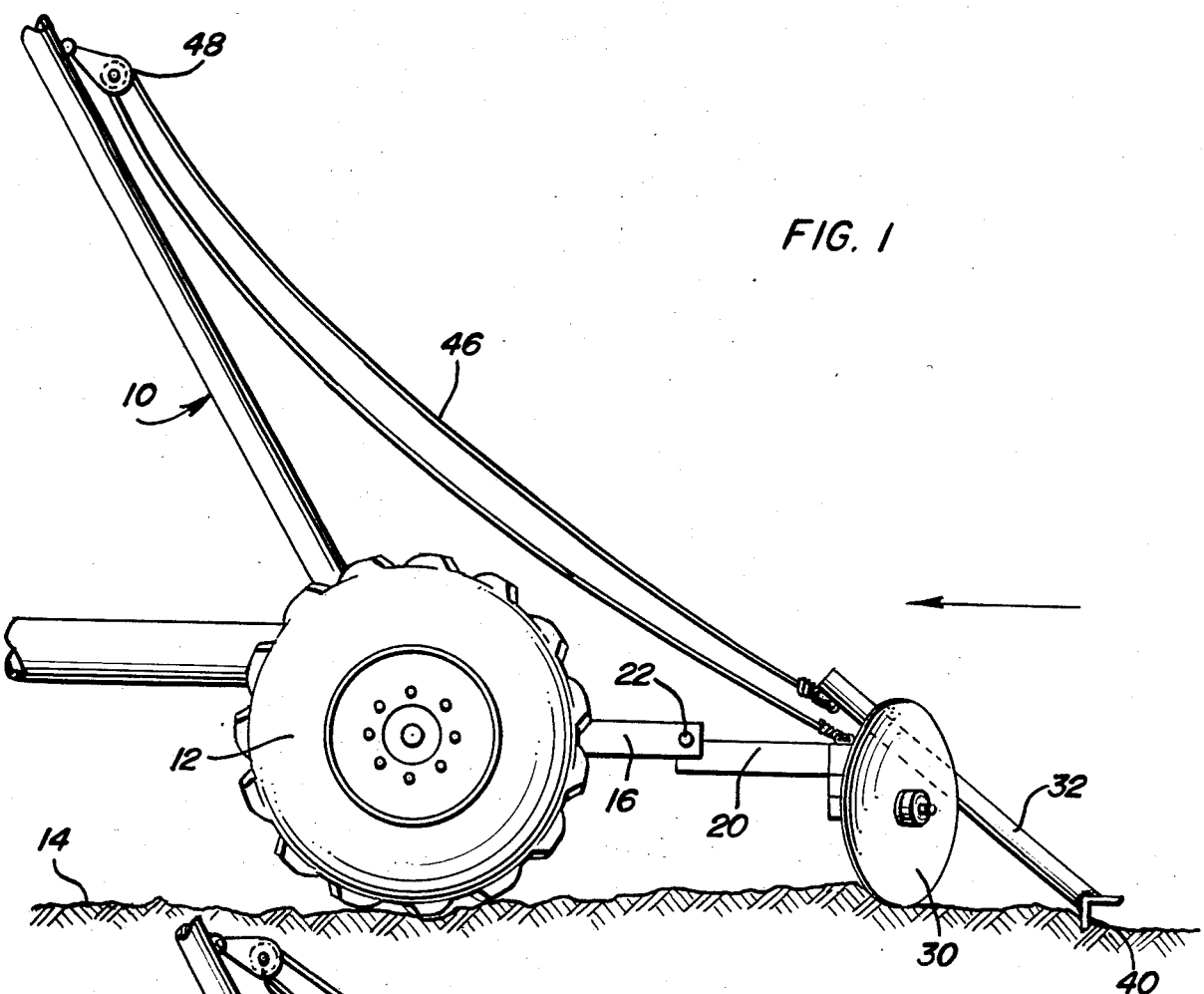
FIG. 1 is a fragmentary side elevational view of the rear portion of an irrigation pipe support tower having the wheel track filler of the instant invention operatively associated therewith and the various components thereof in the positions assumed thereby during forward movement of the tower.
Figure 2:
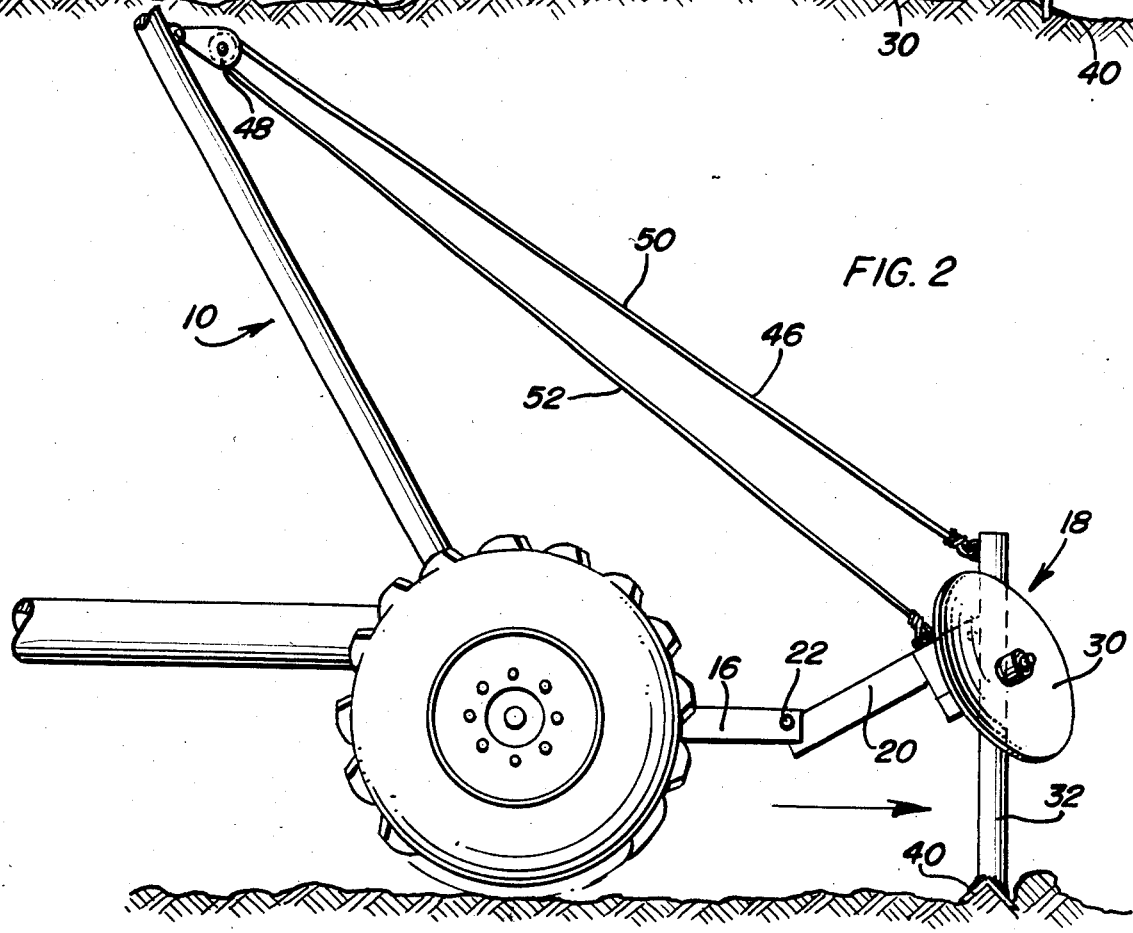
FIG. 2 is a fragmentary side elevational view similar to FIG. 1 but illustrating the relative positions of the shiftable components of the wheel track filling structure assumed during rearward movement of the tower.
Figure 3:
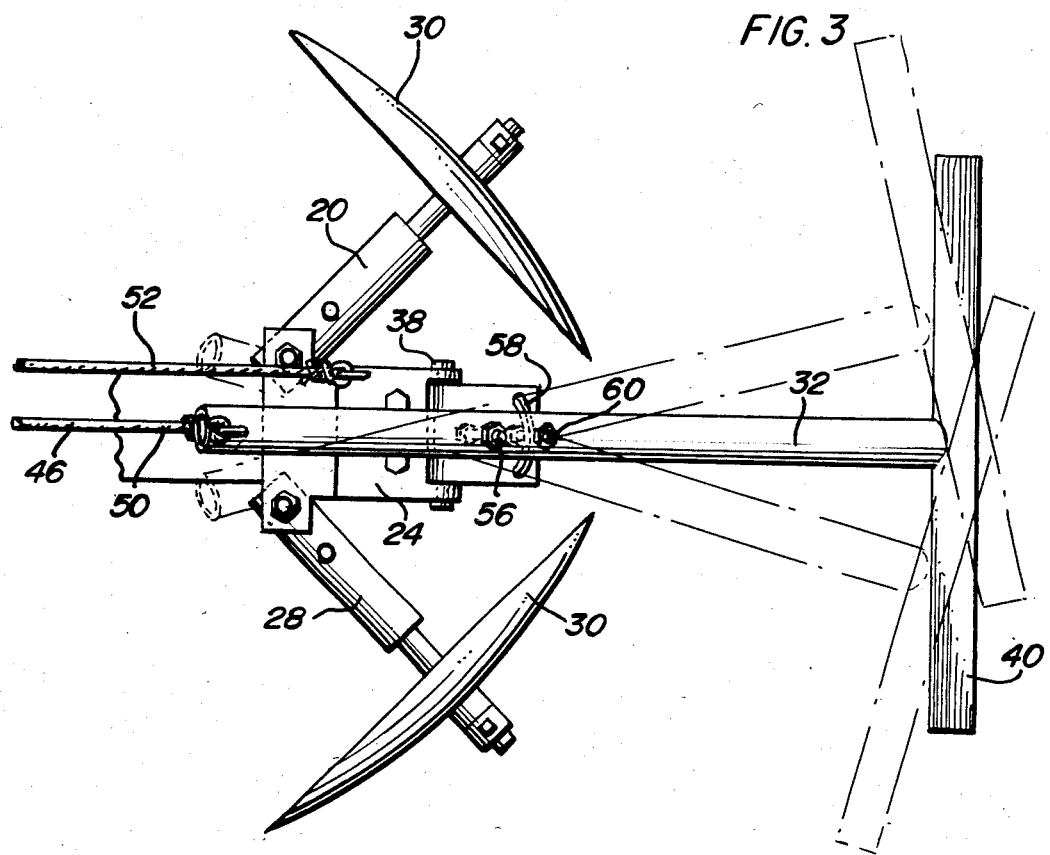
FIG. 3 is an enlarged fragmentary top plan view of the wheel track filling structure.
Figure 4:
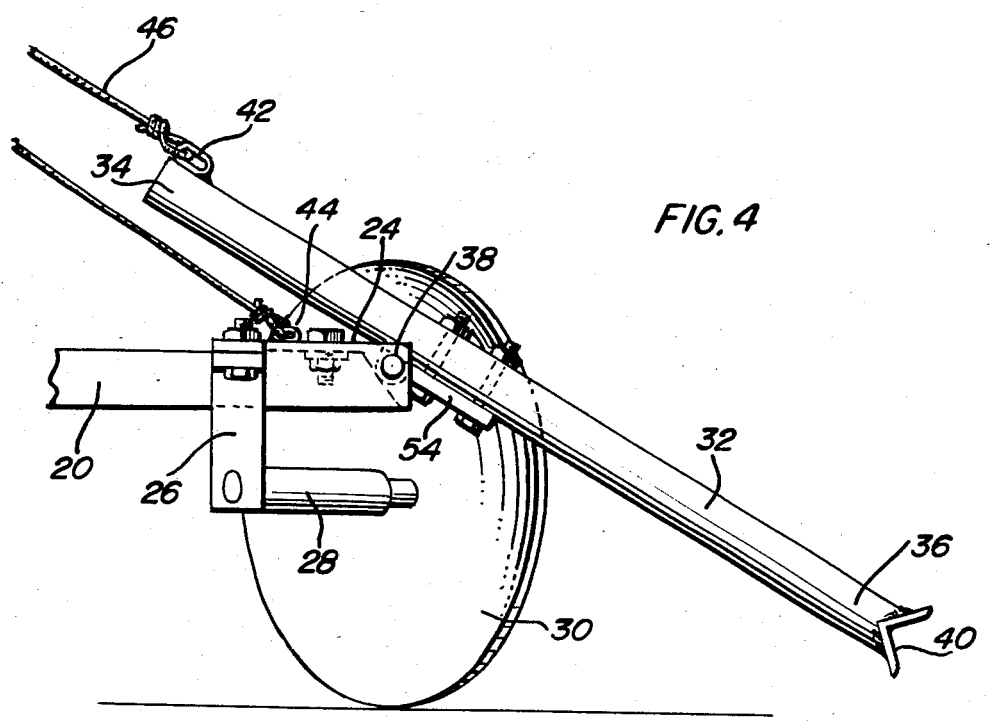
FIG. 4 is a fragmentary side elevational view of the assemblage illustrated in FIG. 3 with the near side track filling disk removed.

Referring now more specifically to the drawings, FIGS. 1 and 2 fragmentarily illustrate a wheeled irrigation pipe support tower referred to in general by the reference numeral 10. The tower 10 includes front and rear support wheels 12 (only the rear wheel being illustrated) and one of the wheels 12 is driven whereby the irrigation pipe (supported from an upper portion of the tower) may be laterally advanced.

Inasmuch as the tower 10 supports an irrigation pipe of the type mounting sprinkler heads therealong and sprinkler-type irrigation of the ground 14 over which the tower is moving will soften the ground, forward movement of the tower 10 over the ground will cause depressed wheel tracks to be formed in the ground 14.

In order to fill such depressed wheel tracks in the ground 14 track fillers are conventionally trailed behind the rear wheels of irrigation pipe support towers.

The tower 10 includes a lower rearwardly projecting portion 16 and the wheel track filler assembly of the instant invention is referred to in general by the reference numeral 18 and is operatively connected to the portion 16 for trailing behind the tower 10.

The wheel track filler assembly 18 includes an elongated front-to-rear extending arm 20 whose forward end is pivotally attached as at 22 for angular displacement relative to the portion 16 about a horizontal transverse axis. The arm 20 is swingable in a vertical plane and supports a mounting bracket 24 at its rear end. Forward opposite side portions of the mounting bracket 24 support depending brackets 26 therefrom for adjusted angular displacement about vertical axes and the lower ends of the brackets 26 mount the inner ends of rearwardly divergent adjustable length axles 28 on whose rear ends a pair of disks 30 are journalled. It will be noted that the disks 30 are disposed to opposite sides of the longitudinal center axis of the arm 20. Accordingly, inasmuch as the arm 20 is substantially aligned with the wheel 12, the disks 30 will be operative to engage the ground 14 on both sides of a depressed wheel track formed by the rear wheel 12 and laterally displace soil from the opposite sides of the track into the latter.

The foregoing may be considered, generally, as conventional wheel track filling structure. However, it may be appreciated that when the tower 10 is moved in reverse the wheel track filler assembly 18 will tend to dig into the ground and may in fact be damaged in the event the arm 20 tends to swing downwardly and rearwardly beneath the rearwardly projecting portion 16.

However, the wheel track filler assembly of the instant invention also includes an elongated lever 32 having front and rear ends 34 and 36. An intermediate length portion of the lever 32 is pivotally mounted from the bracket 24 as at 38 for angular displacement about a horizontal transverse axis and the rear end 36 of the lever 32 includes a transversely extending crosshead 40 in the form of a downwardly and rearwardly opening angle iron. In addition, the forward end 34 of the lever 32 includes an anchor eye 42 while the bracket 24 includes a similar anchor eye 44.

The rear end 36 of the lever 32 is longer than the front end 34 and supports the crosshead 40 therefrom. Accordingly, the rear end 36 of the lever 32 is weighted so as to swing to a rearward and downwardly inclined position with the crosshead 40 engaged with the ground 14. The crosshead 40 thus serves to level the ground behind the wheel track filler assembly 18 after the latter has filled a depressed wheel track formed by the rear wheel 12.

An elongated flexible tension member 46 has one end anchored relative to the eye 42 and the other end anchored relative to the eye 44. The mid-portion of the tension member 46 is trained about a pulley 48 supported from an upper rear portion of the tower 10 and the opposite ends of the tension member 46 are somewhat slack when the tower 10 is moving in a forward direction, see FIG. 1.

However, when the tower 10 is operated in reverse, the crosshead 40 digs into the ground 14 and thus prevents rearward movement of the rear end 36 of the lever 32 relative to the ground 14 and the lever 32 fulcrums about the crosshead 40 from the position thereof illustrated in FIG. 1 to the position thereof illustrated in FIG. 2. As the lever 32 is angularly displaced relative to the arm 20, the pivot connection as at 38 is elevated and a rearward pull is exerted on the upper reach 50 of the tension member 46, see FIG. 2. This of course results in a forward pull being exerted on the lower reach 52 of the tension member 46 and the rear end of the arm is further elevated.

The length of the tension member 46 and the slack therein when the tower 10 is moving forward is such that the rear end of the arm 20 may swing up and down as the disks 30 conform to the contour of the ground 14 over which the tower 10 is moving. However, when the lever 32 is fulcrumed about the crosshead 40 from the position thereof illustrated in FIG. 1 to the position thereof illustrated in FIG. 2, not only is the rear end of the arm 20 elevated by the fulcruming action of the lever 32, but as the lever 32 approaches a substantially vertically disposed position such as that illustrated in FIG. 2 the rate of elevation of the rear end of the arm 20 by the fulcruming action of the lever 32 is reduced. On the other hand, the rearward pull on the upper reach 50 of the tension member 46 is increased and thus the lower reach 52 of the tension member 46 exerts a forward pull on the elevated rear end of the arm 20 to even further elevate the arm 20.

However, inasmuch as continued elevation of the rear end of the arm 20 would raise the end 36 of the lever 32 and the crosshead 40 supported therefrom above the ground 14, the fulcruming action of the lever 32 and the upward pull on the rear end of the arm 20 by the lower reach 52 of the tension member 46 as the lever 32 approaches a substantially vertically disposed position maintains the rear end 36 of the lever 32 and the crosshead 40 at an elevation lightly skimming the ground 14. Should the crosshead 40 contact a stone or other abutment projecting upwardly above the level of the ground, continued swinging of the lever 32 in a clockwise direction past the position thereof illustrated in FIG. 2 will exert an additional upward pull on the rear end of the arm 20 by the lower reach 52 of the tension member 46 and thus automatically raise the end 36 of the lever 32 and the crosshead 40 over such an obstruction.

Of course, when rearward movement of the tower 10 has been terminated and forward movement has again been undertaken, the lever 32 will pivot in a counterclockwise direction from the position thereof illustrated in FIG. 2 of the drawings to the operative position illustrated in FIG. 1.

It may thus be seen that the wheel track filler assembly 18 is totally automatic in operation and that the desired wheel track filling operation may be readily performed when the tower 10 is moving in reverse. Further, the disks 30 of the wheel track filler attachment 18 are automatically elevated relative to the ground 14 when the tower 10 is moved in reverse.

It is also pointed out that the intermediate portion of the lever 32 is mounted on a bracket 54 pivoted from the bracket 24 at 38 and that the lever 32 is adjustably angularly displaceable relative to the bracket 54 by a pivot fastener 56 and a clamp action slot and pin connection incorporating a slot 58 and clamp pin 60.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. What is claimed as new is as follows:

1. A wheeled structure adapted to move over the ground in forward and reverse directions, a wheel track filler including an elongated arm having front and rear end portions, attaching means pivotally attaching said front end portion to said wheeled structure for vertical swinging of said arm about a first horizontal axis transverse to said arm and said directions between a lowered rearwardly projecting position and a raised rearwardly and upwardly inclined position, said rear end portion of said arm including tracking-filling means operative to engage the ground along a depressed wheel track of said wheeled structure and to at least partially fill said wheel track by displacing at least some ground material thereinto from at least one side of the track as said wheeled structure moves forwardly along the ground, an elongated lever, pivot means pivotally supporting said lever from the rear end portion of said arm for swinging about a second horizontal axis transverse to said lever and said directions between a rearwardly and downwardly inclined trailing position with rear end of said lever engaging the ground behind said track-filling means and an upright forwardly displaced position, said rear end of said lever including ground digging means operative to slide over the ground, at least substantially without digging thereinto, when said wheeled structure is forwardly moved over the ground and to dig into the ground when said wheeled structure is rearwardly moved over the ground and cause said lever to pivot in a first direction about said pivot means toward said upright position and to thereby elevate said second axis and the track-filling means supported from the rear end of said arm relative to said ground, and motion transmitting connecting means operatively connected between said lever, wheeled structure and arm, responsive to said lever being swung to said upright position, operative to exert a lifting force on the rear end portion of said arm responsive to swinging of said lever in said first direction from said trailing position toward said upright position, whereby an equilibrium of forces is achieved between the force developed by frictional engagement of said digging means with the ground during said rearward movement tending to further swing said lever in said first direction and the force exerted on said rear end portion of said arm by said connecting means to further elevate the rear end portion of said arm, and thus said ground digging means relative to said structure, which further elevation of said ground digging means functions to reduce said frictional engagement and thus said force tending to further pivot said lever in said first direction.

2. The wheeled structure of claim 1 wherein said connecting means includes an elongated flexible tension member having opposite end portions anchored relative to said lever and arm and a mid-portion guidingly supported from said structure.

3. The wheeled structure of claim 1 wherein said ground digging means comprises a horizontal transverse crosshead carried by the rear end of said lever.

4. The wheeled structure of claim 3 wherein said crosshead comprises a rearwardly and downwardly opening angle member.

5. The wheeled structure of claim 1 including means supporting said lever from said arm for adjusted lateral shifting of the rear end of said lever relative to said arm.

6. The wheeled structure of claim 5 wherein said track-filling means includes a pair of laterally spaced disks angled relative to and disposed on opposite sides of said arm.

7. The wheeled structure of claim 6 wherein said connecting means includes an elongated flexible tension member having opposite end portions anchored relative to said lever and arm and a mid-portion guidingly supported from said structure.

* * * * *